United States Patent [19]

Hemm et al.

[11] 4,340,086
[45] Jul. 20, 1982

[54] HYDRAULIC CONTROL VALVE UNIT

[75] Inventors: Ansgar Hemm, Usingen; Harald Deppner-Hiemesch, Bad Homburg von der Hohe, both of Fed. Rep. of Germany

[73] Assignee: Sperry Vickers, Division of Sperry GmbH, Bad Homburg von der Hohe, Fed. Rep. of Germany

[21] Appl. No.: 141,128

[22] Filed: Apr. 17, 1980

[30] Foreign Application Priority Data

Apr. 19, 1979 [DE] Fed. Rep. of Germany ....... 2915783

[51] Int. Cl.$^3$ .................... F16K 37/00; F16K 15/18
[52] U.S. Cl. .................... 137/554; 137/529; 251/30; 251/43; 91/452
[58] Field of Search .............. 251/30, 43, 25, 33; 91/446, 448, 451, 452; 137/554, 529

[56] References Cited

U.S. PATENT DOCUMENTS

| 2,639,693 | 5/1953 | Miller et al. | 251/25 |
| 2,737,197 | 3/1956 | Joseph | 251/30 X |
| 3,411,416 | 11/1968 | Herd et al. | 91/451 |
| 3,428,063 | 2/1969 | Plotkin et al. | 251/30 X |
| 3,433,131 | 3/1969 | Söylund et al. | 91/452 X |
| 3,688,794 | 9/1972 | Beril et al. | 137/529 |
| 4,198,030 | 4/1980 | Jackson et al. | 137/554 X |
| 4,226,166 | 10/1980 | Frank | 91/451 X |

Primary Examiner—A. Michael Chambers
Attorney, Agent, or Firm—Barnes, Kisselle, Raisch & Choate

[57] ABSTRACT

A self-monitoring hydraulic control valve unit has a main valve and a control valve for controlling supply of hydraulic fluid to a control duct of the main valve. A differential piston is connected in the control duct and has a longitudinal bore which forms part of the control duct, the piston acting at its smaller diameter end on the shutter of the main valve. An electrical monitoring switch such as a proximity switch monitors the position of the differential piston and, therefore, of the main valve.

4 Claims, 5 Drawing Figures

HYDRAULIC CONTROL VALVE UNIT

The present invention concerns a hydraulic control valve unit.

More particularly, the invention relates to a control valve unit having a main valve with a shutter for closing or opening said valve, a control valve for controlling the supply of hydraulic fluid under pressure to a control duct or port of the main valve and electrical switching means for monitoring the state of the said valves.

For reasons of safety the valves of hydraulic presses are electrically monitored. Usually two main valves with their associated control valves are connected between a hydraulic pump and the press and two further main valves with their associated control valves are connected between press and sump. The correct functioning of the control valves is monitored by determining the positions of the movable parts of the valves by respective electrical switches. Therefore four electrical switches are needed, the output signals of which are combined. Since the positions of the control valves only are monitored this arrangement does not guarantee that the associated main valves have operated correctly, even if the correct operation of the control valves has been proved.

An object of the present invention is to provide a control valve unit of simple construction with built-in fail-safe monitoring of the valve operation.

According to the invention there is provided a control valve unit comprising a main valve with a shutter for closing or opening said valve, a control valve for controlling the supply of hydraulic fluid under pressure to a control duct of the main valve; and electrical switching means for monitoring the state of said valves, characterised in that:

a differential piston is connected in the control duct between the control valve and the main valve, said differential piston having a longitudinal bore which forms part of the control duct; the larger diameter portion of the differential piston defines a chamber which communicates with the control valve, the smaller diameter portion of the piston cooperating with the shutter of the main valve; and an electrical monitoring switch is arranged for monitoring the position of the differential piston.

By using only one switch for the monitoring of a main valve and its associated control valve, the control valve unit of the present invention is less complicated then previously used monitored valve systems. Moreover, since it is no longer the position of the control valve itself which is being monitored, but rather the correct functioning of the control valve, that is, whether or not it has shut off or let through the controlling pressure, a greater measure of safety is possible by using the valve unit according to the invention.

A further simplification is possible when the valve unit is used in a pipe leading from a pump to a consumer or load such as, for example, a hydraulic press: the functioning of a second main valve and an associated second control valve may be monitored by the electrical monitoring switch which is associated with the first main valve and the first control valve.

The invention will be further described, by way of example, with reference to the accompanying drawings, in which.

Figure 1:
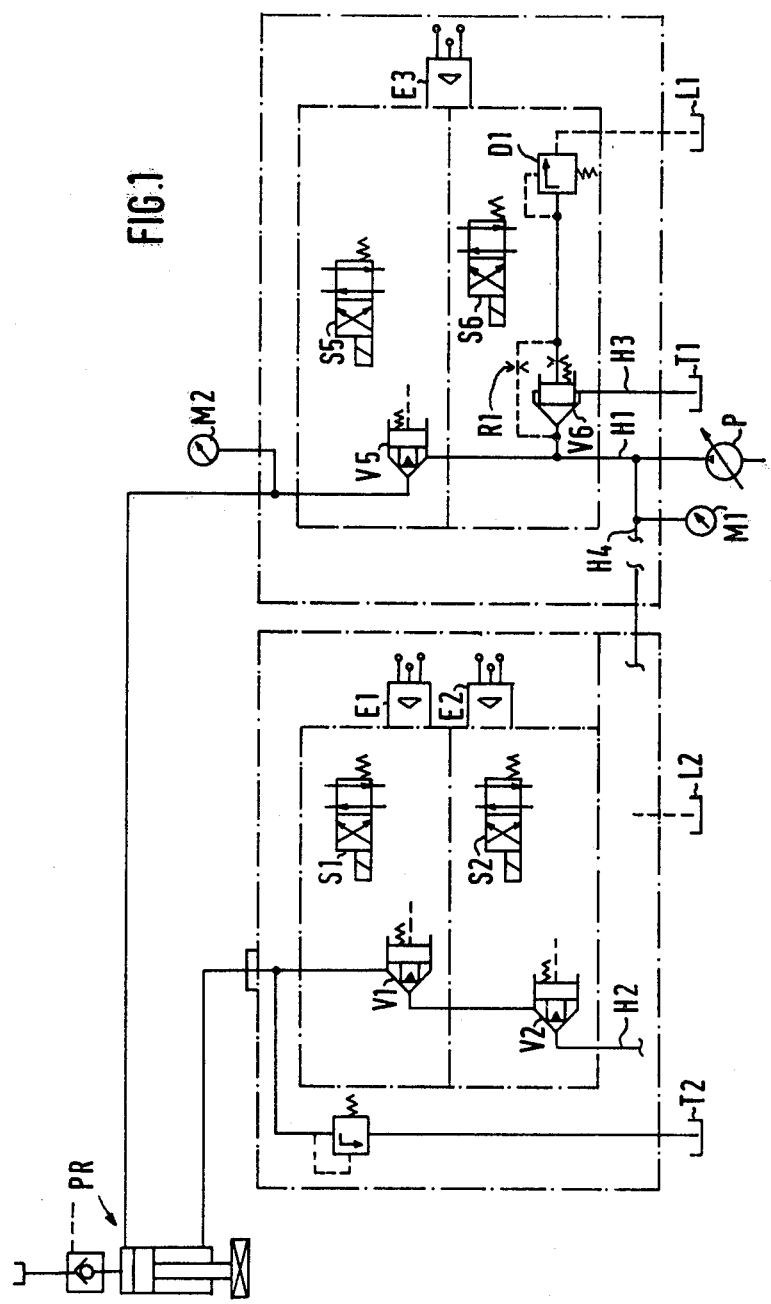
FIG. 1 is a hydraulic circuit for monitored press control utilizing valve units according to the invention.

Referring to FIG. 1, a first pipe H1 leads from a hydraulic pump P to a press PR and a second pipe H2 leads from the press PR to a tank T2. The second pipe H2 incorporates two main valves V1 and V2. The main valve V1 has an associated solenoid control valve S1 the operation of which is monitored by an associated switch E1. Similarly a solenoid control valve S2 and a monitoring switch E2 are associated with the main valve V2. The parts V1, S1, E1 form a single unit, which is shown in detail in FIG. 2; the parts V2, S2 and E2 similarly form a single unit.

The main pipe H1 includes a main valve V5 and an associated solenoid control valve S5. A further main valve V6 is connected in a branch pipe H3 leading from the pipe H1 to a tank T1, the valve V6 being controlled by a solenoid control valve S6. The functioning of the parts V5, S5, V6, S6 is monitored by a single electrical switch E3. The parts V5, S5, E3 form a single unit in the same way as the parts S1, S2, E1 and V2, S2, E2 respectively.

Figure 2:
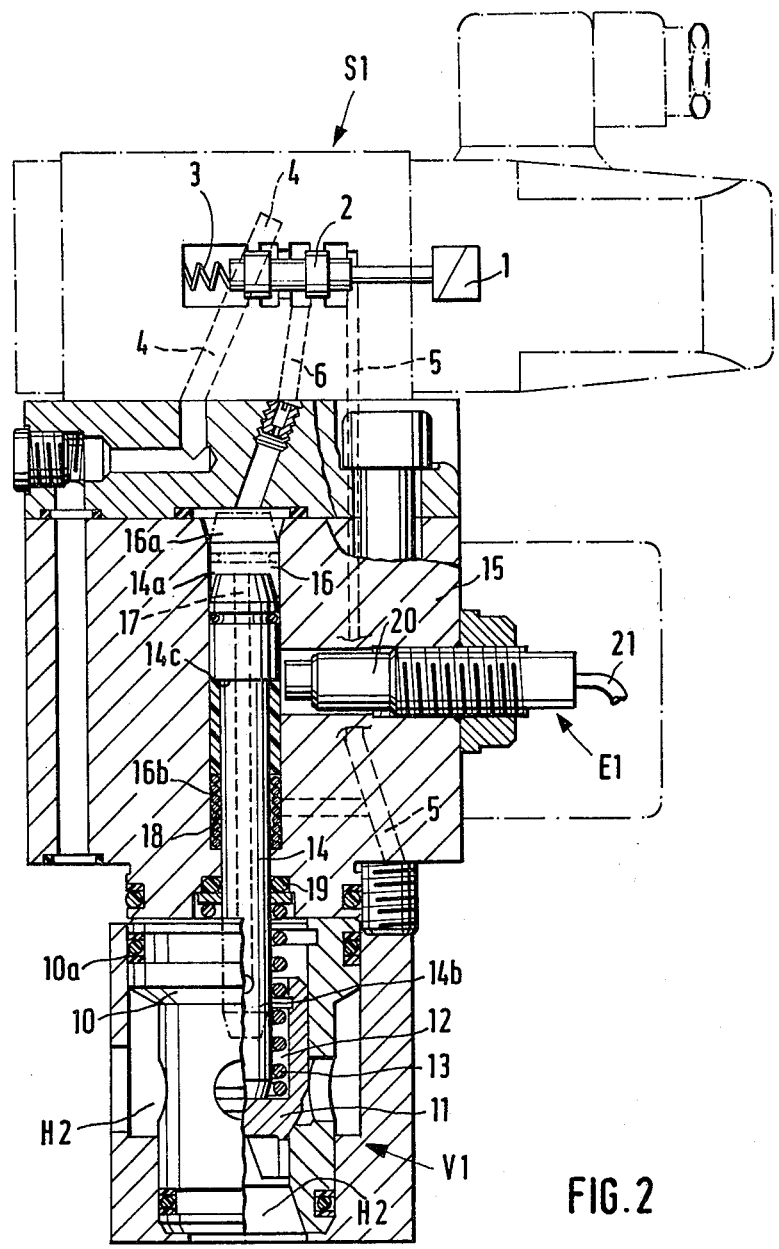
FIG. 2 is an axial sectional view of a valve unit according to one embodiment of the invention as used in the circuit of FIG. 1.

FIG. 2 shows in detail one of the above mentioned control valve units, associated with the solenoid valve S1, it being understood that similar units are associated with the valves S2, S5 and S6. The solenoid valve S1 is of conventional construction and will not be described in detail. The valve S1 comprises an electro-magnet 1 controlling the movement of a valve spool 2 against the action of a return spring 3. The valve S1 controls intercommunication between a hydraulic fluid supply duct 4, a return duct 5 connected to the associated tank and a control duct 6 which controls the operation of the associated valve V1.

The main valve V1 associated with the solenoid valve S1 has a valve shutter 11 which normally closes the pipe H2 in the diagram. Opening of the valve V1 is effected by lifting the valve shutter 11, as viewed in FIG. 2.

The valve shutter 11 is in the form of a differential piston having an internal cylindrical cavity 12 which provides a seat for a spring 13. The spring 13 fits over a reduced diameter stem portion 14b of a differential piston 14 having a larger diameter head portion 14a which slides in a bore 16 of a valve housing 15. The differential piston 14 has a longitudinal bore 17 which extends from the head portion 14a and opens into the surface of the piston 14 adjacent the end of the stem portion 14b. The bore 16 is subdivided by the piston head portion 14a into a chamber 16a and chamber 16b. The chamber 16a is connected to the control duct 6 and the chamber 16b to the return duct 5. The chamber 16b houses a return spring 18 which acts on the head portion 14a of the differential piston 14, urging it towards the control valve S1. The associated monitoring switch E1 cooperates with an annular shoulder 14c which is formed between the portions 14a and 14b of the piston 14. In this example the switch E1 is a proximity switch 20, that is, it detects the proximity of the shoulder 14c electromagnetically and provides an output signal on an output line 21. A sealing ring 19 is seated in the housing 15 and makes sealing contact with the surface of the stem portion 14b of the piston 14.

The operation of the valve unit shown in FIG. 2 is as follows. By energising the electromagnet 1 of the solenoid valve S1 the valve spool 2 is moved to the position shown, in which hydraulic fluid (oil) under pressure is supplied from the duct 4 through the control duct 6 to the chamber 16a, pushing the differential piston 14 downwards, to the position shown on the right in FIG. 2. Simultaneously hydraulic fluid under pressure is supplied through the longitudinal bore 17 of the piston 14 to a chamber 10a on the upper side of the shutter 11, pressing the latter against its seat and closing the valve V1. The closure of the valve V1 is monitored by the proximity switch 20 which detects the proximity of the shoulder 14c and provides an output signal on the line 21. If the valve shutter 11 had not closed, that is, if it had been lifted from its seat, the piston 14 would be raised because of the engagement of the stem portion 14b by the shutter 11, and the shoulder 14c would no longer be situated opposite the proximity switch 20, which would then provide a signal indicating that the valve V1 is not properly closed. The differential piston 14 will also be raised under the action of the spring 18 when there is no hydraulic pressure present in the chamber 16a. In this way the operation of the control valve V1 itself is monitored, and not simply the operation of the controlling solenoid valve S1, as in the prior art.

When the solenoid control valve S1 occupies its other position, (not shown), the ducts 5 and 6 are interconnected and the chambers 16a and 10a become de-pressurised by connection to the return duct 5. The shutter 11, which is a differential piston, therefore rises, opening the valve V1, and the differential piston 14 assumes the upper postion shown on the left in FIG. 2, in which the shoulder 14c is spaced from the proximity switch 20. In this condition the monitoring switch E1 gives an indication that the valve V1 is open.

The connection of the valves V1 and V2 in series in the pipe H2 is a safety measure, both valves V1 and V2 being independently monitored. The valve unit V5, S5, E3 is essentially similar to the unit shown in FIG. 2, and may also be associated with a series "back-up" valve unit, independently monitored.

The valve unit V6, S6 includes a flow-restricting by-pass pipe R1 which shunts the main valve V6 and is connected through a pressure limiting valve D1 to a sump L1.

Figure 3:
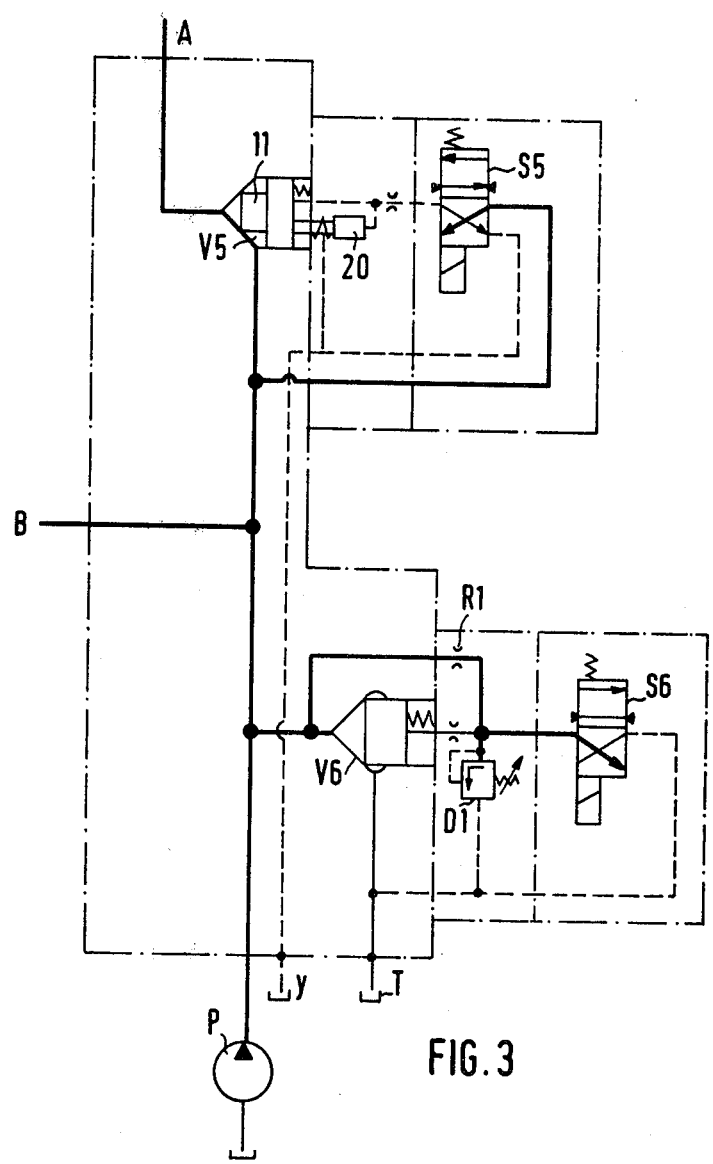
FIG. 3 shows diagrammatically the states of the valves V5 and V6 in the circuit of FIG. 1, in the condition for advancing the press in a working stroke.

When hydraulic pressure is needed to effect a working stroke of the press PR, the main valve V5 is opened by operation of its control valve S5 while the main valve V6 is kept closed by its control valve S6. Both these functions are monitored by the switch E3. Thus if the main valve V6 should be open, the pressure supplied to the valve V5 would collapse, due to flow of oil back to the tank T1 through the pipe H3; the absence of pressure at the main valve 5 would cause the latter to be closed by its spring 13 (FIG. 2) and the spring 18 would lift the associated differential piston 14, so that the proximity switch 20, in this case, monitoring switch E3, provides an output signal indicating that the given order, (to open valve V5) has not been carried out. The hydraulic flow to the press PR is shown diagrammatically by heavy lines in FIG. 3, the shutter 11 of the main valve 5 being open because of the low pressure behind it, and the main valve 6 being closed.

Figure 4:
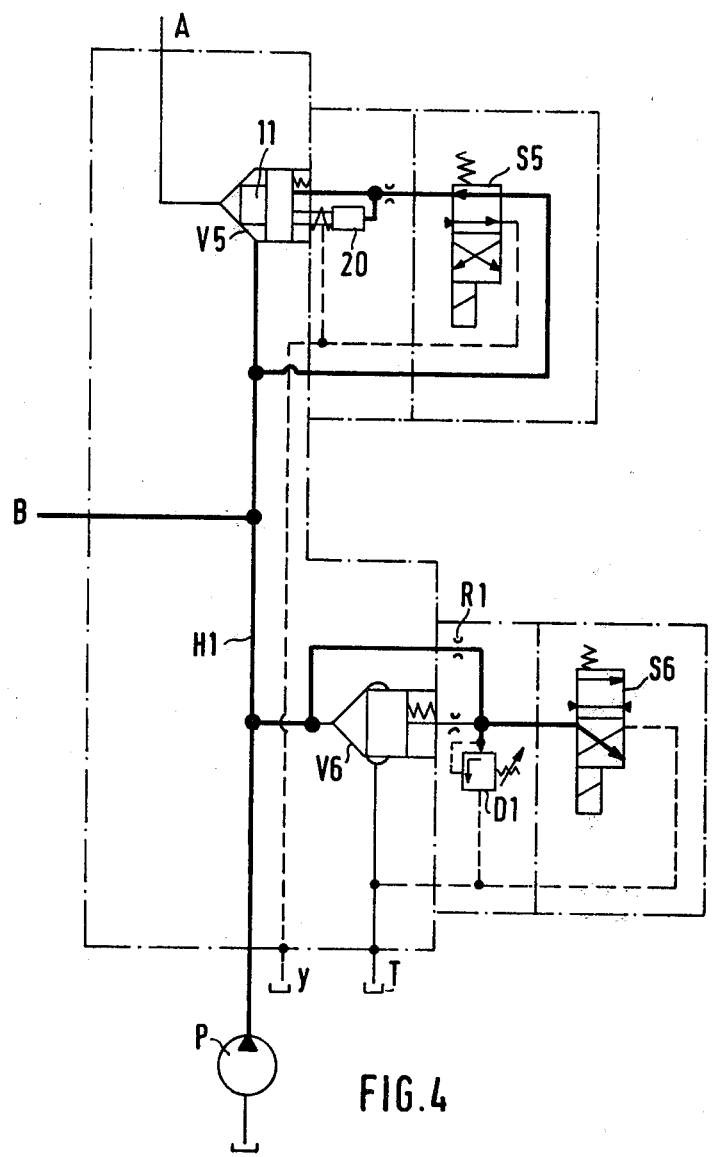
FIG. 4 shows the same details as FIG. 3, in the condition for powered retraction of the press.

FIG. 4 shows diagrammatically the state of the valves V5 and V6 for effecting a powered retraction stroke of the press. The shutters of the valves V5 and V6 receive the full oil pressure on their reverse sides, by operation of the associated control switches S5 and S6. Under these conditions the proximity switch 20, that is, the monitoring switch E3 associated with the valve V5, should indicate that valve V5 is closed, or, failing this, that a fault has occurred. If, for example, the main valve V6 had not closed, the pressure in the pipe H1 would have collapsed, whereupon the spring 18 in the valve V5 would lift the associated differential piston 14 and the proximity switch 20 would no longer indicate that the valve V5 was closed.

Figure 5:
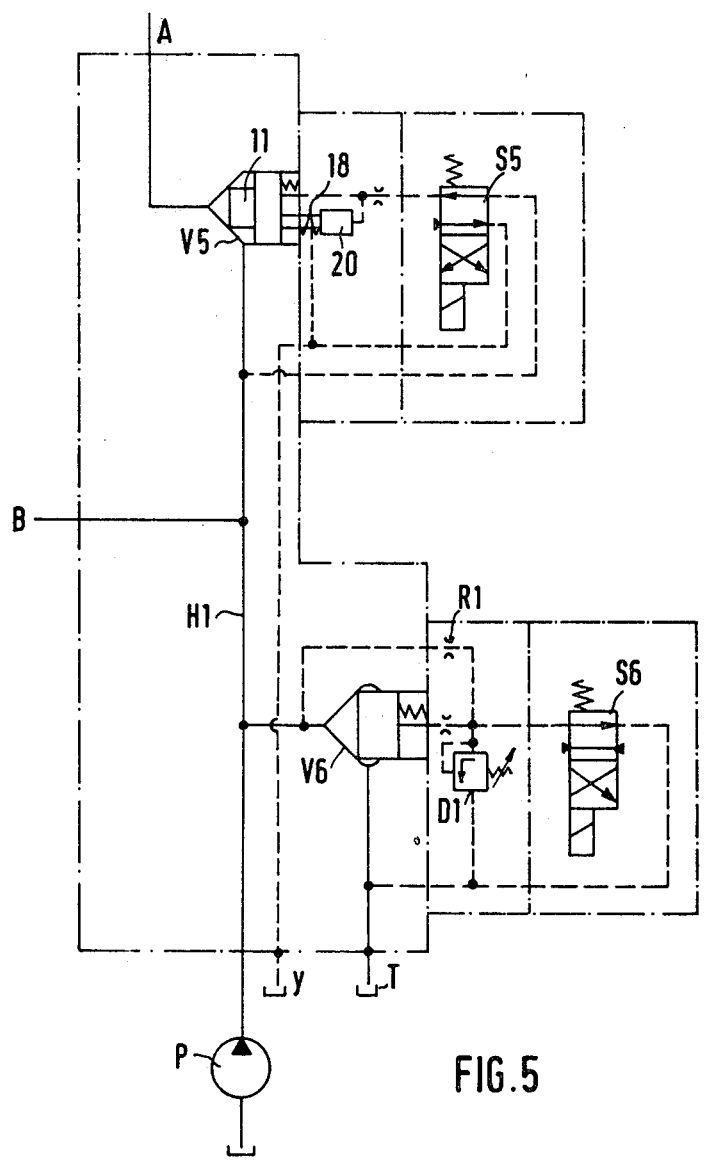
FIG. 5 shows the same details as FIG. 3, in the condition for effecting a pressureless operational cycle of the press.

FIG. 5 shows the states of the valves V5 and V6 for a pressureless cycle of the press, that is, advance and retraction of the press without working hydraulic pressure supplied thereto, for example for workpiece positioning or setting-up. In this case the main valve V6 is open, so that the pressure in the pipe H1 collapses; the differential piston 14 of the valve V5 is lifted by the spring allowing the valve V5 to open and relieving the pressure connected to the press PR. The lifting of the differential piston 14 is monitored by the proximity switch 20, which indicates that the valve V5 is open.

What is claimed is:

1. Valving apparatus comprising
a main valve,
said main valve including a main valve housing having a valve bore and inlet and outlet passages therein,
a first differential piston as a closure member slidable in said bore,
a valve spring engaging said closure member,
said closure member having a first position for shutting said inlet and outlet passages and a second position for opening the same,
a pilot valve,
said pilot valve including a separate pilot valve housing, a valve spool, a first duct for supplying fluid under pressure, a second duct for venting fluid to a tank and a control duct,
a control line, said control line connecting said control duct of said pilot valve to said closure member of said main valve and including
a second differential piston slidable in a connecting bore,
said second differential piston having a relatively larger piston area, a relatively smaller piston area and a longitudinal bore interconnecting both piston areas and forming a part of said control line,
said relatively larger piston area facing said pilot valve, said relatively smaller piston area facing said main valve and cooperating with said closure member for following said first and second positions thereof and taking first and second positions, if there is fluid under pressure in the control line,
and electric means for monitoring said positions of said second differential piston.

2. Valving apparatus set forth in claim 1 including a spring, said spring acting upon said second differential piston to urge the latter in the direction to said pilot valve, and a spring chamber, said spring chamber being connected to said tank.

3. Valving apparatus set forth in claim 1 wherein said second differential piston has a shoulder between said relatively larger and smaller areas and said electric means is a proximity switch cooperating with said shoulder.

4. Valving apparatus set forth in claim 1 including a second main valve and a second pilot valve for controlling said second main valve, said second main valve being arranged in a line connected to said inlet passage of said first main valve upstream thereof, said second main valve, when open, diverting fluid to said tank.

* * * * *